US012145389B2

(12) United States Patent
Oota

(10) Patent No.: US 12,145,389 B2
(45) Date of Patent: Nov. 19, 2024

(54) THERMAL TRANSFER SHEET

(71) Applicant: Dai Nippon Printing Co., Ltd., Tokyo (JP)

(72) Inventor: Mitsuhiro Oota, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 141 days.

(21) Appl. No.: 17/628,363

(22) PCT Filed: Aug. 24, 2020

(86) PCT No.: PCT/JP2020/031773
§ 371 (c)(1),
(2) Date: Jan. 19, 2022

(87) PCT Pub. No.: WO2021/033778
PCT Pub. Date: Feb. 25, 2021

(65) Prior Publication Data

US 2022/0281256 A1 Sep. 8, 2022

(30) Foreign Application Priority Data

Aug. 22, 2019 (JP) ................................ 2019-152217

(51) Int. Cl.
*B41M 5/44* (2006.01)
*B41M 5/395* (2006.01)
*B41M 5/42* (2006.01)

(52) U.S. Cl.
CPC .............. *B41M 5/44* (2013.01); *B41M 5/395* (2013.01); *B41M 5/42* (2013.01); *B41M 2205/06* (2013.01); *B41M 2205/30* (2013.01); *B41M 2205/38* (2013.01); *B41M 2205/40* (2013.01)

(58) Field of Classification Search
CPC .......... B41M 5/395; B41M 5/42; B41M 5/44; B41M 2205/06; B41M 2205/30; B41M 2205/38; B41M 2205/40
See application file for complete search history.

(56) References Cited

U.S. PATENT DOCUMENTS 5,034,301 A * 7/1991 Miyagawa ......... B41M 5/38242 430/211
5,968,668 A 10/1999 Fukui
2018/0244095 A1 8/2018 Yoda et al.

FOREIGN PATENT DOCUMENTS

EP 0 282 080 A2 9/1988
JP H05-318991 A 12/1993
JP H08-282135 A 10/1996
JP H09-175098 A 7/1997
JP H10-157307 A 6/1998
(Continued)

OTHER PUBLICATIONS

Extended European Search Report dated Jul. 25, 2023 (Application No. 20854228.2).

(Continued)

*Primary Examiner* — Gerard Higgins
(74) *Attorney, Agent, or Firm* — BURR PATENT LAW, PLLC

(57) ABSTRACT

A thermal transfer sheet according to the present disclosure includes a substrate and a transfer layer disposed on the substrate. The transfer layer includes at least a peeling layer containing an allyl resin. This provides a thermal transfer sheet with high transferability and thin line printability.

10 Claims, 2 Drawing Sheets

(56) References Cited

FOREIGN PATENT DOCUMENTS

| | | | |
|---|---|---|---|
| JP | H10-217625 | A | 8/1998 |
| JP | 2017-052278 | A | 3/2017 |
| KR | 2001-0044881 | A | 6/2001 |
| WO | 2011/152457 | A1 | 12/2011 |

OTHER PUBLICATIONS

International Search Report and Written Opinion (Application No. PCT/JP2020/031773) dated Nov. 10, 2020 (with English translation).

English translation of the International Preliminary Report on Patentability (Chapter I) dated Mar. 3, 2022 (Application No. PCT/JP2020/031773).

Korean Office Action (with English translation) dated Apr. 24, 2024 (Application No. 10-2022-7009249).

Japanese Office Action (with English translation) dated Apr. 30, 2024 (Application No. 2021-540994).

* cited by examiner

THERMAL TRANSFER SHEET

TECHNICAL FIELD

The present disclosure relates to thermal transfer sheets.

BACKGROUND ART

A thermofusible transfer process is conventionally known in which an image or a protective layer is formed by applying energy to a thermal transfer sheet including a substrate and a transfer layer using a thermal head or the like and thereby transferring the transfer layer to a transfer-receiving article such as paper or a plastic sheet.

Because the image formed by the thermofusible transfer process has high density and high sharpness, this process is suitable for recording binary images such as characters and line drawings. With the thermofusible transfer process, variable information such as addresses, customer information, numbering, and barcodes can be recorded on transfer-receiving article using a computer and a thermal transfer printer.

In general, such thermal transfer sheets require high transferability so that high-quality images can be formed without missing or faint areas. Such thermal transfer sheets require high thin-line printability so that fine images can be formed without a loss of detail or faint areas. To meet such requirements, it is proposed that a transfer layer be provided with a peeling layer or a nontransferable release layer be disposed on the substrate side (for example, PTL 1).

CITATION LIST

Patent Literature

PTL 1: Japanese Unexamined Patent Application Publication No. 2017-052278

SUMMARY OF INVENTION

Technical Problem

The inventors have found that the transferability and thin-line printability of a thermal transfer sheet can be noticeably improved by incorporating an allyl resin into a peeling layer included in a transfer layer.

The present disclosure has been made based on the foregoing findings. An object of the present disclosure is to provide a thermal transfer sheet with high transferability and thin-line printability.

Solution to Problem

A summary of the present disclosure is as follows:

A thermal transfer sheet including a substrate and a transfer layer disposed on the substrate, the transfer layer including at least a peeling layer, and the peeling layer containing an allyl resin.

Advantageous Effects of Invention

According to the present disclosure, a thermal transfer sheet with high transferability and thin-line printability can be provided.

DESCRIPTION OF EMBODIMENTS

[Thermal Transfer Sheet]

Embodiments of a thermal transfer sheet according to the present disclosure will be described with reference to the drawings. FIGS. 1 to 7 are schematic sectional views, each illustrating one embodiment of the thermal transfer sheet according to the present disclosure.

Figure 1:
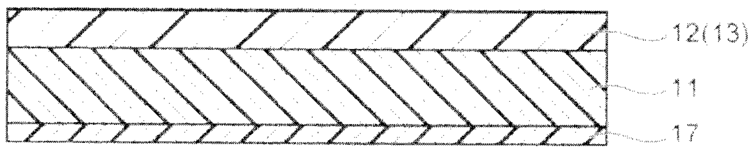
FIG. 1 is a schematic sectional view illustrating one embodiment of a thermal transfer sheet according to the present disclosure.

As illustrated in FIG. 1, a thermal transfer sheet 10 according to the present disclosure includes a substrate 11 and a transfer layer 13 including at least a peeling layer 12.

Figure 2:
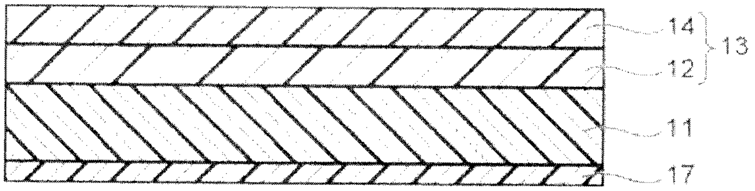
FIG. 2 is a schematic sectional view illustrating one embodiment of the thermal transfer sheet according to the present disclosure.

In one embodiment, as illustrated in FIG. 2, the transfer layer 13 includes a colored layer 14 on the peeling layer 12.

Figure 3:
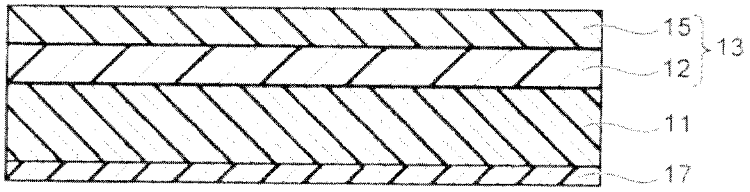
FIG. 3 is a schematic sectional view illustrating one embodiment of the thermal transfer sheet according to the present disclosure.
Figure 4:
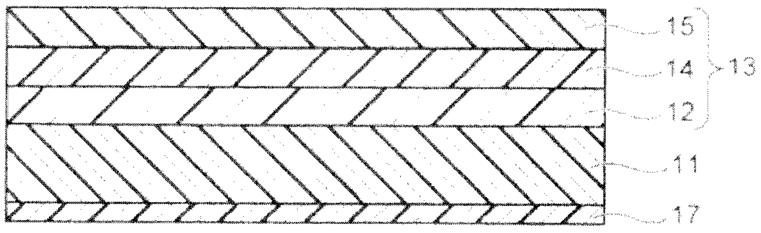
FIG. 4 is a schematic sectional view illustrating one embodiment of the thermal transfer sheet according to the present disclosure.

In one embodiment, as illustrated in FIG. 3, the transfer layer 13 includes a protective layer 15 on the peeling layer 12. If the transfer layer 13 includes the colored layer 14, as illustrated in FIG. 4, the protective layer 15 is disposed on the colored layer 14.

Figure 5:
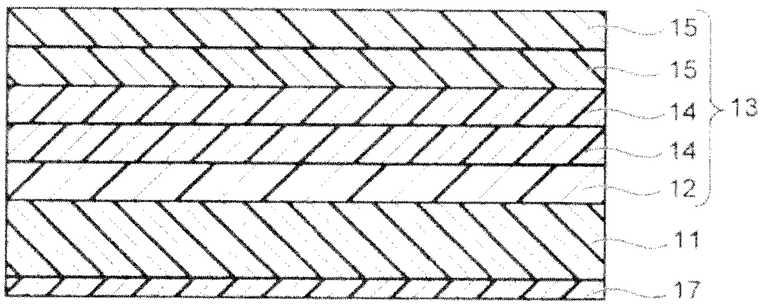
FIG. 5 is a schematic sectional view illustrating one embodiment of the thermal transfer sheet according to the present disclosure.
Figure 6:
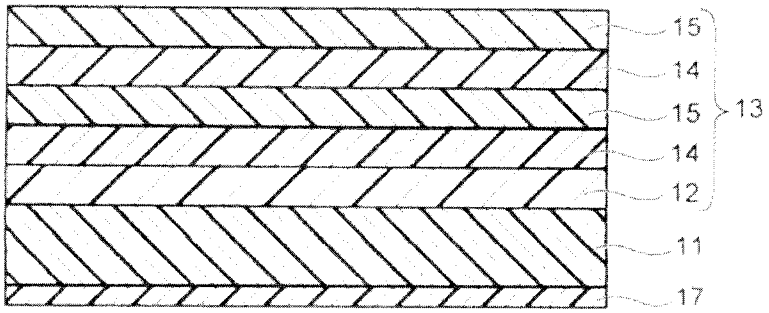
FIG. 6 is a schematic sectional view illustrating one embodiment of the thermal transfer sheet according to the present disclosure.

In one embodiment, the transfer layer 13 may include two or more colored layers 14 and may include two or more protective layers 15. If the transfer layer 13 includes two or more colored layers 14 and two or more protective layers 15, as illustrated in FIG. 5, the colored layers 14 may be successively stacked, and the protective layers 15 may then be successively stacked thereon. Alternatively, as illustrated in FIG. 6, the colored layers 14 and the protective layers 15 may be alternately and successively stacked.

Figure 7:
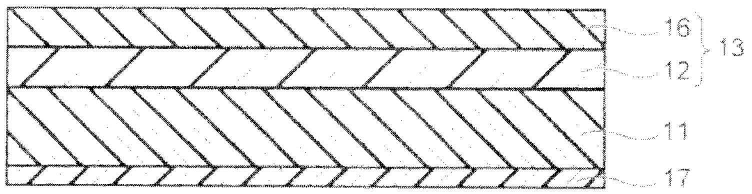
FIG. 7 is a schematic sectional view illustrating one embodiment of the thermal transfer sheet according to the present disclosure.

In one embodiment, as illustrated in FIG. 7, the transfer layer 13 includes an adhesive layer 16 at the outermost surface thereof.

In one embodiment, as illustrated in FIGS. 1 to 7, the thermal transfer sheet 10 includes a back layer 17 on the opposite surface of the substrate 11 from the surface on which the transfer layer 13 is disposed.

The individual layers included in the thermal transfer sheet according to the present disclosure will be described below.

(Substrate)

Any substrate can be used without particular limitation as long as the substrate has sufficient heat resistance to withstand thermal energy applied during thermal transfer and also has sufficient mechanical strength to support a layer, such as the transfer layer, disposed on the substrate, and solvent resistance.

Examples of substrates that can be used include films formed from resin materials (hereinafter simply referred to as "resin film"), including polyesters such as polyethylene terephthalate (PET), polybutylene terephthalate (PBT), polyethylene naphthalate (PEN), poly-1,4-cyclohexylenedimethylene terephthalate, and terephthalic acid-cyclohexanedimethanol-ethylene glycol copolymers; polyamides such as nylon 6 and nylon 6,6; polyolefins such as polyethylene (PE), polypropylene (PP), and polymethylpentene; vinyl resins such as polyvinyl chloride, polyvinyl alcohol (PVA), polyvinyl acetate, vinyl chloride-vinyl acetate copolymers, and polyvinylpyrrolidone (PVP); vinyl acetal resins such as polyvinyl acetoacetal and polyvinyl butyral; (meth) acrylic resins such as polyacrylates, polymethacrylates, and polymethyl methacrylate; imide resins such as polyimides and polyetherimides; cellulose resins such as cellophane, cellulose acetate, nitrocellulose, cellulose acetate propionate (CAP), and cellulose acetate butyrate (CAB); styrene resins such as polystyrene (PS); polycarbonates; and ionomer resins.

Among the resin materials mentioned above, from the viewpoint of heat resistance and mechanical strength, polyesters such as PET and PEN are preferred, and PET is particularly preferred.

In the present disclosure, "(meth)acrylic" includes both "acrylic" and "methacrylic". "(Meth)acrylate" includes both "acrylate" and "methacrylate".

Laminates of the resin films mentioned above can also be used as the substrate. Laminates of resin films can be fabricated by methods such as dry lamination, wet lamination, and extrusion.

If the substrate is a resin film, the resin film may be either a stretched film or an unstretched film. From the viewpoint of strength, it is preferred to use a uniaxially or biaxially stretched film.

Although there is no particular limitation on the thickness of the substrate, the substrate preferably has a thickness of 3.0 μm or more and 25.0 μm or less from the viewpoint of the mechanical strength of the substrate and the transmission of thermal energy during thermal transfer.

(Transfer Layer)

The thermal transfer sheet according to the present disclosure includes a transfer layer on the substrate. The transfer layer includes at least a peeling layer. In the present disclosure, of the layers constituting the transfer layer, the peeling layer is a layer disposed on the surface of the substrate in contact with the transfer layer.

In one embodiment, the transfer layer includes a colored layer on the peeling layer. In another embodiment, the transfer layer includes a protective layer on the peeling layer. If the transfer layer includes the colored layer, the protective layer is disposed on the colored layer. In still another embodiment, the transfer layer includes an adhesive layer at the outermost surface thereof. Here, "outermost surface" refers to a surface of the transfer layer that comes into contact with a transfer-receiving article when the transfer layer is transferred to the transfer-receiving article.

In one embodiment, the transfer layer may include two or more colored layers and may include two or more protective layers. If the transfer layer includes two or more colored layers and two or more protective layers, the colored layers may be successively stacked, and the protective layers may then be successively stacked thereon. Alternatively, the colored layers and the protective layers may be alternately stacked.

(Peeling Layer)

The peeling layer contains at least one allyl resin. In the present specification, "allyl resin" refers to a resin containing at least one allyl monomer as a polymerization component. Examples of allyl monomers include diallyl phthalate, triallyl isocyanurate, diallyl tetrabromophthalate, allyl glycidyl ether, trimethylolpropane diallyl ether, pentaerythritol triallyl ether, triallyl trimellitate, tetraallyl pyromellitate, allyl sorbate, diallyl maleate, diallyl fumarate, diallyl citrate, and tetraallyl butanetetracarboxylate. Among these, diallyl phthalate is preferred from the viewpoint of the transferability and thin-line printability of the thermal transfer sheet.

The allyl resin may contain a compound other than the allyl monomer as a copolymerization component. The proportion of structural units derived from other compounds in the allyl resin is preferably 10% by mass or less, more preferably 5% by mass or less, still more preferably 3% by mass or less.

From the viewpoint of the plasticizer resistance of the transfer layer, the allyl resin preferably has an iodine value of 40 g/100 g or more and 95 g/100 g or less, more preferably 45 g/100 g or more and 70 g/100 g or less.

The allyl resin is preferably one or more of resins represented by the following general formulas (1) to (4). If the peeling layer contains an allyl resin having such a structure, the transferability and thin-line printability of the thermal transfer sheet are further improved. In view of durability and plasticizer resistance, resins represented by the following general formulas (1) and (3) are more preferred, and resins represented by the following general formula (1) are particularly preferred. The peeling layer may simultaneously contain resins represented by general formulas (1) to (4).

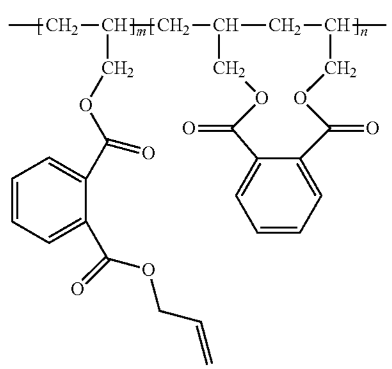

(1)

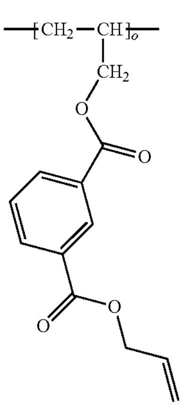

(2)

-continued (3)

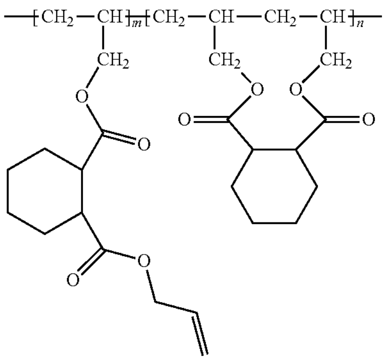

(4)

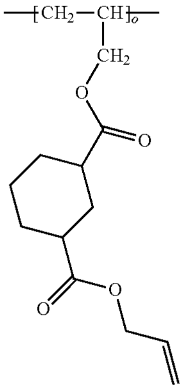

In general formulas (1) to (4) above, m, n, and o represent an integer of 1 or more.

As such allyl resins, commercial products may be used. As allyl resins represented by general formula (1), DAISO DAP (registered trademark) A, DAISO DAP (registered trademark) S, and DAISO DAP (registered trademark) K manufactured by Osaka Soda Co., Ltd. and the like can be used. As an allyl resin represented by general formula (2), DAISO ISO DAP manufactured by Osaka Soda Co., Ltd. can be used. As an allyl resin represented by general formula (3), RADPAR (registered trademark) AD-032 manufactured by Osaka Soda Co., Ltd. can be used.

From the viewpoint of the transferability and thin-line printability of the thermal transfer sheet, the allyl resin preferably has a weight average molecular weight (Mw) of 5,000 or more and 100,000 or less, more preferably 15,000 or more and 70,000 or less. In the present specification, "weight average molecular weight (Mw)" refers to a value measured by gel permeation chromatography using polystyrene as a standard substance, i.e., a value measured by a method in accordance with JIS K 7252-1.

From the viewpoint of the transferability and thin-line printability of the thermal transfer sheet, the content of the allyl resin in the peeling layer is preferably 20% by mass or more and 100% by mass or less, more preferably 35% by mass or more and 100% by mass or less.

The allyl resin can be cured by irradiation with active energy radiation such as ultraviolet radiation or can be cured by heating in combination with a polymerization initiator such as a peroxide. In the present disclosure, however, it is desirable not to cure the allyl resin.

The peeling layer can contain a resin material other than the allyl resin (hereinafter referred to as "other resin material"). Examples of resin materials include polyesters, vinyl resins, vinyl acetal resins, polyamides, (meth)acrylic resins, imide resins, cellulose resins, styrene resins, polycarbonates, and ionomer resins.

Among these, the peeling layer preferably contains a polyester from the viewpoint of the foil adherence of the transfer layer. Here, "the foil adherence of the transfer layer" refers to the resistance of the transfer layer to unintentional peeling from the substrate.

From the viewpoint of the durability of the transfer layer, the peeling layer preferably contains a vinyl resin, particularly a vinyl chloride-vinyl acetate copolymer.

From the viewpoint of the durability of the transfer layer, the polyester preferably has a number average molecular weight (Mn) of 8,000 or more and 20,000 or less, more preferably 12,000 or more and 16,000 or less. In the present specification, "number average molecular weight (Mn)" refers to a value measured by gel permeation chromatography using polystyrene as a standard substance, i.e., a value measured by a method in accordance with JIS K 7252-1.

From the viewpoint of the maintenance of stability in product form, the polyester preferably has a glass transition temperature (Tg) of 45° C. or higher and 85° C. or lower. In the present specification, "glass transition temperature (Tg)" refers to a value determined by differential scanning calorimetry (DSC) in accordance with JIS K 7121.

From the viewpoint of both the thin-line printability and foil adherence of the transfer layer, the ratio of the content of the polyester to the content of the allyl resin in the peeling layer (content of polyester/content of allyl resin) is preferably, by mass, 10/90 or more and 85/15 or less, more preferably 15/85 or more and 60/40 or less, still more preferably 25/75 or more and 55/45 or less.

From the viewpoint of both the thin-line printability and foil adherence of the transfer layer, the content of the polyester in the peeling layer is preferably 15% by mass or more and 85% by mass or less, more preferably 18% by mass or more and 60% by mass or less, still more preferably 25% by mass or more and 75% by mass or less.

From the viewpoint of the durability of the transfer layer, the vinyl resin preferably has a number average molecular weight (Mn) of 13,000 or more and 37,000 or less, more preferably 14,000 or more and 30,000 or less.

From the viewpoint of the durability of the transfer layer, the vinyl resin preferably has a glass transition temperature (Tg) of 63° C. or higher and 83° C. or lower, more preferably 65° C. or higher and 80° C. or lower.

From the viewpoint of both the thin-line printability and durability of the transfer layer, the ratio of the content of the vinyl resin to the content of the allyl resin in the peeling layer (content of vinyl resin/content of allyl resin) is preferably, by mass, 10/90 or more and 85/15 or less, more preferably 15/85 or more and 60/40 or less.

From the viewpoint of both the thin-line printability and durability of the transfer layer, the content of the vinyl resin in the peeling layer is preferably 15% by mass or more and 85% by mass or less, more preferably 18% by mass or more and 60% by mass or less, still more preferably 25% by mass or more and 58% by mass or less.

If a vinyl chloride-vinyl acetate copolymer is used as the vinyl resin, the proportion of vinyl acetate in the vinyl chloride-vinyl acetate copolymer is preferably, by mass, 5% by mass or more, more preferably 8% by mass or more, from the viewpoint of the plasticizer resistance of the peeling layer. From the viewpoint of the durability of the peeling layer, the proportion of vinyl acetate is preferably, by mass, 30% by mass or less.

The peeling layer may contain an additive such as a filler, a plasticizer, an antistatic agent, an ultraviolet absorber, inorganic particles, organic particles, a release agent, or a dispersant.

From the viewpoint of transferability and thin-line printability, the peeling layer preferably has a thickness of 0.1 μm or more and 5.0 μm, more preferably 0.2 μm or more and 1.5 μm.

The peeling layer can be formed by dispersing or dissolving the above materials in water or a suitable solvent to prepare a coating liquid, applying the coating liquid to the substrate by known means to form a coating, and drying the coating. Examples of known coating means include roll coating, reverse roll coating, gravure coating, reverse gravure coating, bar coating, and rod coating.

(Colored Layer)

In one embodiment, the transfer layer includes a colored layer containing a colorant and the above allyl resin.

The colorant contained in the colored layer is not particularly limited and may be either a dye or a pigment. Examples of colorants include red colorants such as cadmium red, cadmopone red, chrome red, vermillion, red iron oxide, azo pigments, alizarin lake, quinacridone, and cochineal lake perylene; yellow colorants such as yellow ocher, aureolin, cadmium yellow, cadmium orange, chrome yellow, zinc yellow, naples yellow, nickel yellow, azo pigments, and greenish yellow; blue colorants such as ultramarine, blue verditer, cobalt, phthalocyanine, anthraquinone, and indigoid; green colorants such as cinnabar green, cadmium green, chrome green, phthalocyanine, azomethine, and perylene; black colorants such as carbon black; white colorants such as silica, calcium carbonate, and titanium oxide; metallic pigments such as aluminum, nickel, chromium, brass, tin, brass, bronze, zinc, silver, platinum, gold, and oxides thereof, and particles, such as glass particles, subjected to metal deposition; and pearl pigments such as mica pigments and flaky alumina pigments coated with oxides of metals such as titanium, iron, zirconium, silicon, aluminum, and cerium.

The content of the colorant in the colored layer can be appropriately changed depending on the type of colorant used and may be, for example, 50% by mass or more and 85% by mass or less.

From the viewpoint of the transferability and thin-line printability of the thermal transfer sheet, the content of the above allyl resin in the colored layer is preferably 7% by mass or more and 35% by mass or less, more preferably 13% by mass or more and 33% by mass or less.

The colored layer may contain the above other resin material. Among the other resin materials, from the viewpoint of the durability of the transfer layer, vinyl resins are preferred, and vinyl chloride-vinyl acetate copolymers are more preferred. The preferred ranges of the number average molecular weight (Mn) and glass transition (Tg) of the vinyl resin are as described above.

From the viewpoint of both the thin-line printability and durability of the transfer layer, the ratio of the content of the vinyl resin to the content of the allyl resin in the colored layer (content of vinyl resin/content of allyl resin) is preferably, by mass, 10/90 or more and 60/40 or less, more preferably 15/85 or more and 40/60 or less.

From the viewpoint of both the thin-line printability and durability of the transfer layer, the content of the vinyl resin in the colored layer is preferably 0.5% by mass or more and 15% by mass or less, more preferably 1% by mass or more and 6% by mass or less.

The colored layer may contain the above additive.

From the viewpoint of the density of an image formed on a transfer-receiving article, the colored layer preferably has a thickness of 1.0 μm or more and 10.0 μm or less, more preferably 1.0 μm or more and 5.0 μm or less.

The colored layer can be formed by dispersing or dissolving the above materials in water or a suitable solvent to prepare a coating liquid, applying the coating liquid to the peeling layer by known means to form a coating, and drying the coating. Examples of known coating means include the methods mentioned above.

(Protective Layer)

In one embodiment, from the viewpoint of the foil adherence of the transfer layer, the transfer layer may include a protective layer containing the above allyl resin on the peeling layer or the colored layer.

The protective layer may contain the above other resin material. Among the other resin materials, polyesters are preferred from the viewpoint of the foil adherence of the transfer layer. The preferred ranges of the number average molecular weight (Mn) and glass transition (Tg) of the polyester, the preferred range of the ratio of the content of the polyester to the content of the allyl resin, and the preferred range of the content of the polyester in the protective layer are similar to those for the peeling layer.

From the viewpoint of the durability of the transfer layer, the protective layer preferably contains a vinyl resin, particularly a vinyl chloride-vinyl acetate copolymer. The preferred ranges of the number average molecular weight (Mn) and glass transition (Tg) of the vinyl resin, the preferred range of the ratio of the content of the vinyl resin to the content of the allyl resin, and the preferred range of the content of the vinyl resin in the protective layer are similar to those for the peeling layer.

The protective layer may contain the above additive.

From the viewpoint of the foil adherence of the transfer layer and the transferability and thin-line printability of the thermal transfer sheet, the protective layer preferably has a thickness of 0.1 μm or more and 3.0 μm or less, more preferably 0.2 μm or more and 1.5 μm or less.

The protective layer can be formed by dispersing or dissolving the above materials in water or a suitable solvent to prepare a coating liquid, applying the coating liquid to the peeling layer or the colored layer by known means to form a coating, and drying the coating. Examples of known coating means include the methods mentioned above.

(Adhesive Layer)

In one embodiment, the transfer layer includes an adhesive layer containing the above allyl resin at the outermost surface thereof (i.e., the surface of the transfer layer that comes into contact with a transfer-receiving article when the transfer layer is transferred to the transfer-receiving article). If the adhesive layer contains a colorant, the colorant may decrease the adhesion between the adhesive layer and the transfer-receiving article and may thus decrease the transferability and thin-line printability of the thermal transfer sheet. However, if the adhesive layer contains an allyl resin, the allyl resin can reduce the decrease in the adhesion between the adhesive layer and the transfer-receiving article and can effectively improve the density of an image formed on the transfer-receiving article.

From the viewpoint of the transferability and thin-line printability of the thermal transfer sheet, the allyl resin contained in the adhesive layer preferably has a softening temperature of 55° C. or higher and 120° C. or lower, more preferably 60° C. or higher and 115° C. or lower. In the present specification, "softening temperature" refers to a temperature measured by a method in accordance with the ball and ring method in JIS K 2207.

From the viewpoint of the transferability and thin-line printability of the thermal transfer sheet, the content of the allyl resin in the adhesive layer is preferably 7% by mass or more and 55% by mass or less, more preferably 13% by mass or more and 55% by mass or less.

In one embodiment, the adhesive layer contains the above colorant. This colorant may be the same as or different from the colorant contained in the colored layer.

The content of the colorant in the adhesive layer can be appropriately changed depending on the type of colorant used and may be, for example, 50% by mass or more and 85% by mass or less.

The adhesive layer may contain the above other resin material. Among the other resin materials, from the viewpoint of the transferability and thin-line printability of the thermal transfer sheet and the durability of the transfer layer, vinyl resins are preferred, and vinyl chloride-vinyl acetate copolymers are more preferred.

The preferred proportion of vinyl acetate in the vinyl chloride-vinyl acetate copolymer and the preferred ranges of the number average molecular weight (Mn) and glass transition (Tg) of the vinyl resin are as described above. The preferred range of the ratio of the content of the vinyl resin to the content of the allyl resin and the preferred range of the content of the vinyl resin are similar to those for the colored layer.

The adhesive layer may contain the above additive.

The adhesive layer can be formed by dispersing or dissolving the above materials in water or a suitable solvent to prepare a coating liquid, applying the coating liquid to the peeling layer or other layer by known means to form a coating, and drying the coating. Examples of known coating means include the methods mentioned above.

(Back Layer)

In one embodiment, the thermal transfer sheet according to the present disclosure includes a back layer on a main surface of the substrate on which the transfer layer is not disposed. If the thermal transfer sheet includes the back layer, sticking and formation of creases due to heating during thermal transfer, for example, can be inhibited.

In one embodiment, the back layer contains a resin material. Examples of resin materials include cellulose resins, styrene resins, vinyl resins, polyesters, polyurethanes, silicone-modified polyurethanes, fluorinated polyurethanes, and (meth)acrylic resins.

In one embodiment, the back layer contains, as the resin material, a two-component curing resin that cures in combination with an isocyanate compound or other compound. Examples of such resins include polyvinyl acetals such as polyvinyl acetoacetal and polyvinyl butyral.

In one embodiment, the back layer may contain inorganic or organic particles from the viewpoint of the inhibition of sticking and formation of creases.

Examples of inorganic particles include clay minerals such as talc and kaolin, carbonates such as calcium carbonate and magnesium carbonate, hydroxides such as aluminum hydroxide and magnesium hydroxide, sulfates such as calcium sulfate, oxides such as silica, graphite, niter, and boron nitride. These inorganic particles may be used alone or in a combination of two or more thereof.

Examples of organic particles include organic resin particles formed of (meth)acrylic resins, Teflon (registered trademark) resins, silicone resins, lauroyl resins, phenol resins, acetal resins, styrene resins, polyamides, and the like, and crosslinked resin particles obtained by reacting these with crosslinking agents. These organic particles may be used alone or in a combination of two or more thereof.

From the viewpoint of both the transmission of thermal energy during thermal transfer and the inhibition of sticking and formation of creases, the back layer preferably has a thickness of 0.1 μm or more and 2 μm or less, more preferably 0.1 μm or more and 1 μm or less.

The back layer can be formed by dispersing or dissolving the above materials in water or a suitable solvent to prepare a coating liquid, applying the coating liquid to the substrate by known means to form a coating, and drying the coating. Examples of known coating means include the methods mentioned above.

The present disclosure relates to, for example, the following [1] to [12]:

[1] A thermal transfer sheet including a substrate and a transfer layer disposed on the substrate, the transfer layer including at least a peeling layer, and the peeling layer containing an allyl resin.

[2] The thermal transfer sheet according to [1], wherein the transfer layer further includes a colored layer disposed on the peeling layer, and the colored layer contains a colorant and an allyl resin.

[3] The thermal transfer sheet according to [1] or [2], wherein the transfer layer further includes a protective layer disposed on the peeling layer or on the colored layer, and the protective layer contains an allyl resin.

[4] The thermal transfer sheet according to any one of [1] to [3], wherein the transfer layer includes an adhesive layer containing an allyl resin at an outermost surface thereof.

[5] The thermal transfer sheet according to [4], wherein the adhesive layer contains a colorant.

[6] The thermal transfer sheet according to any one of [1] to [5], wherein the allyl resin contains diallyl phthalate as a polymerization component.

[7] The thermal transfer sheet according to any one of [1] to [6], wherein the allyl resin is at least one resin selected from the group consisting of the following general formulas (1) to (4):

(1)

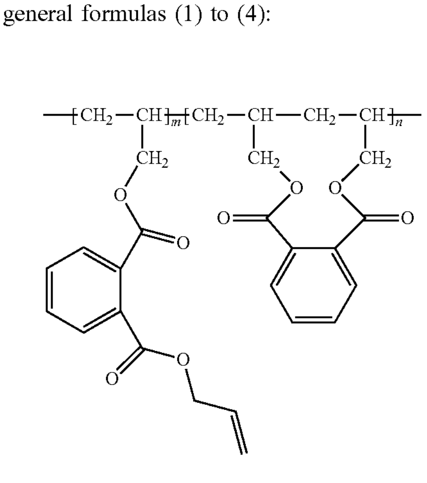

-continued (2)

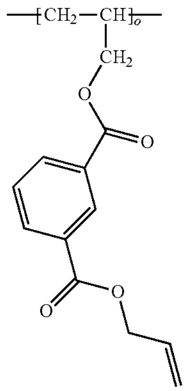

(3)

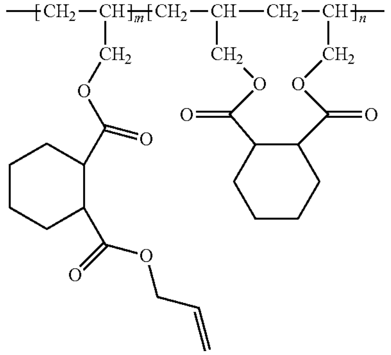

(4)

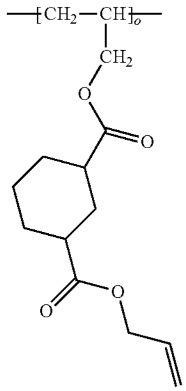

wherein, in formulas (1) to (4), m, n, and o represent an integer of 1 or more.

[8] The thermal transfer sheet according to any one of [1] to [7], wherein the allyl resin has a weight average molecular weight (Mw) of 5,000 or more and 100,000 or less.

[9] The thermal transfer sheet according to any one of [1] to [8], wherein the peeling layer further contains a polyester.

[10] The thermal transfer sheet according to [9], wherein a ratio of a content of the polyester to a content of the allyl resin in the peeling layer (content of polyester/content of allyl resin) is 10/90 or more and 85/15 or less by mass.

[11] The thermal transfer sheet according to any one of [1] to [10], wherein the adhesive layer further contains a vinyl resin.

[12] The thermal transfer sheet according to [11], wherein a ratio of a content of the vinyl resin to a content of the allyl resin in the adhesive layer (content of vinyl resin/content of allyl resin) is 10/90 or more and 60/40 or less by mass.

EXAMPLES

Next, the present disclosure will be more specifically described with reference to the examples, although the present disclosure is not limited to these examples.

Example 1

A coating liquid, for forming a peeling layer, having the following composition was applied to one surface of a PET film having a thickness of 4.5 μm and was dried to form a peeling layer having a thickness of 1.0 μm.

<Coating Liquid for Forming Peeling Layer>

| | |
|---|---|
| Allyl Resin A | 100 parts by mass |

(DAISO DAP (registered trademark) A manufactured by Osaka Soda Co., Ltd., Mw: 50,000 to 60,000, softening temperature: 70° C. to 110° C., iodine value: 50 to 60 g/100 g)

| | |
|---|---|
| Methyl ethyl ketone (MEK) | 200 parts by mass |
| Toluene | 200 parts by mass |

A coating liquid, for forming a colored layer, having the following composition was applied to the peeling layer formed as described above and was dried to form a colored layer having a thickness of 1.5 μm.

<Coating Liquid for Forming Colored Layer>

| | |
|---|---|
| Titanium oxide | 80 parts by mass |
| Allyl Resin A | 20 parts by mass |
| MEK | 50 parts by mass |
| Toluene | 50 parts by mass |

A coating liquid, for forming a protective layer, having the following composition was applied to the colored layer formed as described above and was dried to form a protective layer having a thickness of 1.0 μm.

<Coating Liquid for Forming Protective Layer>

| | |
|---|---|
| Allyl Resin A | 100 parts by mass |
| MEK | 200 parts by mass |
| Toluene | 200 parts by mass |

A coating liquid, for forming an adhesive layer, having the following composition was applied to the protective layer formed as described above and was dried to form a colored layer having a thickness of 1.5 μm.

<Coating Liquid for Forming Adhesive Layer>

| | |
|---|---|
| Titanium oxide | 80 parts by mass |
| Allyl Resin A | 20 parts by mass |
| MEK | 50 parts by mass |
| Toluene | 50 parts by mass |

A coating liquid, for forming a back layer, having the following composition was applied to the other surface of the PET film and was dried to form a back layer having a thickness of 0.3 μm. A thermal transfer sheet was thus obtained.

<Coating Liquid for Forming Back Layer>

| | |
|---|---|
| Polyvinyl butyral | 2.0 parts by mass |

(S-LEC (registered trademark) BX-1 manufactured by Sekisui Chemical Co., Ltd.)

| | |
|---|---|
| Polyisocyanate | 9.2 parts by mass |

(BURNOCK (registered trademark) D750 manufactured by DIC Corporation)

| | |
|---|---|
| Phosphate ester surfactant | 1.3 parts by mass |

(PLYSURF (registered trademark) A208N manufactured by DKS Co. Ltd.)

| | |
|---|---|
| Talc | 0.3 parts by mass |

(MICRO ACE (registered trademark) P-3 manufactured by Nippon Talc Co., Ltd.)

| | |
|---|---|
| Toluene | 43.6 parts by mass |
| MEK | 43.6 parts by mass |

Examples 2 to 36 and Comparative Examples 1 to 5

Thermal transfer sheets were fabricated as in Example 1 except that the configuration of the peeling layer and the thickness of the peeling layer were changed as shown in Tables 1 to 3.

Details of the individual components in Tables 1 to 3 are as follows:

Allyl Resin B: DAISO DAP (registered trademark) S manufactured by Osaka Soda Co., Ltd., Mw: 30,000 to 40,000, softening temperature: 70° C. to 105° C., iodine value: 50 to 60 g/100 g Allyl Resin C: DAISO DAP (registered trademark) K manufactured by Osaka Soda Co., Ltd., Mw: 50,000 to 60,000, softening temperature: 65° C. to 100° C., iodine value: 50 to 60 g/100 g Allyl Resin D: DAISO ISO DAP (registered trademark) manufactured by Osaka Soda Co., Ltd., Mw: 30,000 to 50,000, softening temperature: 50° C. to 80° C., iodine value: 75 to 90 g/100 g Allyl Resin E: RADPAR (registered trademark) AD-032 manufactured by Osaka Soda Co., Ltd., Mw: 30,000 to 60,000, softening temperature: 60° C. to 100° C., iodine value: 55 to 70 g/100 g Polyester A: VYLON (registered trademark) 226 manufactured by Toyobo Co., Ltd., Mn: 15,000, Tg: 65° C.

Polyester B: VYLON (registered trademark) 240 manufactured by Toyobo Co., Ltd., Mn: 15,000, Tg: 60° C.

Polyester C: VYLON (registered trademark) GK250 manufactured by Toyobo Co., Ltd., Mn: 10,000, Tg: 60° C.

Polyester D: VYLON (registered trademark) GK880 manufactured by Toyobo Co., Ltd., Mn: 18,000, Tg: 84° C.

Polyester E: VYLON (registered trademark) 600 manufactured by Toyobo Co., Ltd., Mn: 16,000, Tg: 47° C.

Polyester F: VYLON (registered trademark) 885 manufactured by Toyobo Co., Ltd., Mn: 8,000, Tg: 79° C.

Vinyl chloride-vinyl acetate copolymer A: SOLBIN (registered trademark) CNL manufactured by Nissin Chemical Industry Co., Ltd., Mn: 16,000, Tg: 76° C., proportion of vinyl acetate: 10% by mass (denoted as PVCA A in the tables)

Vinyl chloride-vinyl acetate copolymer B: SOLBIN (registered trademark) A manufactured by Nissin Chemical Industry Co., Ltd., Mn: 35,000, Tg: 76° C., proportion of vinyl acetate: 3% by mass (denoted as PVCA B in the tables)

Vinyl chloride-vinyl acetate copolymer C: SOLBIN (registered trademark) AL manufactured by Nissin Chemical Industry Co., Ltd., Mn: 27,000, Tg: 76° C., proportion of vinyl acetate: 2% by mass (denoted as PVCA C in the tables)

Vinyl chloride-vinyl acetate copolymer D: SOLBIN (registered trademark) TAO manufactured by Nissin Chemical Industry Co., Ltd., Mn: 15,000, Tg: 77° C., proportion of vinyl acetate: 2% by mass (denoted as PVCA D in the tables)

Polyvinyl acetal A: S-LEC (registered trademark) KS-1 manufactured by Sekisui Chemical Co., Ltd., Tg: 107° C., hydroxyl value: 25% by mass Polyvinyl acetal B: S-LEC (registered trademark) KS-10 manufactured by Sekisui Chemical Co., Ltd., Tg: 106° C., hydroxyl value: 25% by mass (Meth)acrylic resin A: DIANAL (registered trademark) BR-87 manufactured by Mitsubishi Chemical Corporation, Mn: 25,000, Tg: 105° C.

(Meth)acrylic resin B: DIANAL (registered trademark) BR-83 manufactured by Mitsubishi Chemical Corporation, Mn: 40,000, Tg: 105° C.

<Transferability Evaluation>

A card printer (HDP5000 manufactured by HID Global Corporation, thermal head: resolution in main scanning direction=300 dpi, resolution in sub-scanning direction=300 dpi) was used. The transfer layers of the thermal transfer sheets obtained in the examples and the comparative examples were transferred to vinyl chloride cards to form solid images (0/255 image gradation). Printed materials were thus obtained.

The resulting images were visually observed and were evaluated based on the following evaluation scale. The evaluation results are shown in Tables 1 to 3.

(Evaluation Scale)

A: No missing or faint areas were observed.

B: Missing or faint areas were slightly observed.

C: Missing or faint areas were observed.

NG: The transfer layer was not transferred, posing a problem for practical use.

<Thin-Line Printability Evaluation>

A card printer (HDP5000 manufactured by HID Global Corporation, thermal head: resolution in main scanning direction=300 dpi, resolution in sub-scanning direction=300 dpi) was used. The transfer layers of the thermal transfer sheets obtained in the examples and the comparative examples were transferred to vinyl chloride cards to form images including thin lines with a width of three dots. Printed materials were thus obtained.

The resulting images were visually observed and were evaluated based on the following evaluation scale. The evaluation results are shown in Tables 1 to 3.

(Evaluation Scale)

A: No loss of detail or faint areas were observed.

B: A loss of detail or faint areas were slightly observed.

C: A loss of detail or faint areas were observed.

NG: A loss of detail or faint areas were considerably observed, posing a problem for practical use.

<Durability Evaluation>

The printed materials obtained in the above transferability test were subjected to a Taber test (load: 500 gf, 60 cycles/min.) in accordance with ANSI-INCITS 322-2002, 5.9 Surface Abrasion using a Taber tester (CS-10F abrasive wheel).

The image density was measured in the same manner as above every 50 cycles, and the number of cycles at which the decrease in image density was 50% was determined and evaluated on the following evaluation scale. The evaluation results are shown in Tables 1 to 3. For Comparative Examples 1 and 2, "-" is shown because the transfer layer could not be transferred.

(Evaluation Scale)

A: 400 cycles or more

B: 300 cycles or more and less than 400 cycles

C: 200 cycles or more and less than 300 cycles

D: less than 200 cycles

TABLE 1

| | Configuration of peeling layer | | | | Configuration of colored layer | | | | | | Configuration of protective layer | | | |
|---|---|---|---|---|---|---|---|---|---|---|---|---|---|---|
| | Allyl resin | | Other resin material | | Colorant | | Allyl resin | | Other resin material | | Allyl resin | | Other resin material | |
| | Type | Content (% by mass) | Type | Content (% by mass) | Type | Content (% by mass) | Type | Content (% by mass) | Type | Content (% by mass) | Type | Content (% by mass) | Type | Content (% by mass) |
| Ex.1 | A | 100 | | | Titanium oxide | 80 | A | 20 | | | A | 100 | | |
| Ex.2 | B | 100 | | | Titanium oxide | 80 | B | 20 | | | B | 100 | | |
| Ex.3 | C | 100 | | | Titanium oxide | 80 | C | 20 | | | C | 100 | | |
| Ex.4 | D | 100 | | | Titanium oxide | 80 | D | 20 | | | D | 100 | | |
| Ex.5 | E | 100 | | | Titanium oxide | 80 | E | 20 | | | E | 100 | | |
| Ex.6 | A | 50 | Polyester A | 50 | Titanium oxide | 80 | A | 18 | PVCA D | 2 | A | 50 | Polyester A | 50 |
| Ex.7 | B | 50 | Polyester A | 50 | Titanium oxide | 80 | B | 18 | PVCA D | 2 | B | 50 | Polyester A | 50 |
| Ex.8 | C | 50 | Polyester A | 50 | Titanium oxide | 80 | C | 18 | PVCA D | 2 | C | 50 | Polyester A | 50 |
| Ex.9 | D | 50 | Polyester A | 50 | Titanium oxide | 80 | D | 18 | PVCA D | 2 | D | 50 | Polyester A | 50 |
| Ex.10 | E | 50 | Polyester A | 50 | Titanium oxide | 80 | E | 18 | PVCA D | 2 | E | 50 | Polyester A | 50 |
| Ex.11 | C | 50 | Polyester B | 50 | Titanium oxide | 80 | C | 18 | PVCA D | 2 | C | 50 | Polyester B | 50 |
| Ex.12 | C | 50 | Polyester C | 50 | Titanium oxide | 80 | C | 18 | PVCA D | 2 | C | 50 | Polyester C | 50 |
| Ex.13 | C | 50 | Polyester D | 50 | Titanium oxide | 80 | C | 18 | PVCA D | 2 | C | 50 | Polyester D | 50 |
| Ex.14 | C | 50 | PVCA A | 50 | Titanium oxide | 80 | C | 18 | PVCA D | 2 | C | 50 | PVCA A | 50 |
| Ex.15 | C | 50 | PVCA B | 50 | Titanium oxide | 80 | C | 18 | PVCA D | 2 | C | 50 | PVCA B | 50 |
| Ex.16 | C | 50 | PVCA C | 50 | Titanium oxide | 80 | C | 18 | PVCA D | 2 | C | 50 | PVCA C | 50 |
| Ex.17 | C | 50 | PVCA D | 50 | Titanium oxide | 80 | C | 18 | PVCA D | 2 | C | 50 | PVCA D | 50 |
| Ex.18 | C | 20 | Polyester A | 80 | Titanium oxide | 80 | C | 18 | PVCA D | 2 | C | 20 | Polyester A | 80 |
| Ex.19 | C | 80 | Polyester A | 20 | Titanium oxide | 80 | C | 18 | PVCA D | 2 | C | 80 | Polyester A | 20 |
| Ex.20 | C | 20 | PVCA D | 80 | Titanium oxide | 80 | C | 18 | PVCA D | 2 | C | 20 | PVCA D | 80 |
| Ex.21 | C | 80 | PVCA D | 20 | Titanium oxide | 80 | C | 18 | PVCA D | 2 | C | 80 | PVCA D | 20 |

| | Configuration of adhesive layer | | | | | | Evaluation results | | |
|---|---|---|---|---|---|---|---|---|---|
| | Colorant | | Allyl resin | | Other resin material | | | | |
| | Type | Content (% by mass) | Type | Content (% by mass) | Type | Content (% by mass) | Transferability | Thin-line printability | Durability |
| Ex.1 | Titanium oxide | 80 | A | 20 | | | A | A | B |
| Ex.2 | Titanium oxide | 80 | B | 20 | | | A | A | B |
| Ex.3 | Titanium oxide | 80 | C | 20 | | | A | A | B |
| Ex.4 | Titanium oxide | 80 | D | 20 | | | A | A | B |
| Ex.5 | Titanium oxide | 80 | E | 20 | | | A | A | B |
| Ex.6 | Titanium oxide | 80 | A | 18 | PVCA D | 2 | A | A | A |
| Ex.7 | Titanium oxide | 80 | B | 18 | PVCA D | 2 | A | A | A |
| Ex.8 | Titanium oxide | 80 | C | 18 | PVCA D | 2 | A | A | A |
| Ex.9 | Titanium oxide | 80 | D | 18 | PVCA D | 2 | A | A | B |
| Ex.10 | Titanium oxide | 80 | E | 18 | PVCA D | 2 | A | A | A |
| Ex.11 | Titanium oxide | 80 | C | 18 | PVCA D | 2 | A | A | A |
| Ex.12 | Titanium oxide | 80 | C | 18 | PVCA D | 2 | A | A | B |

TABLE 1-continued

| | | | | | | | | | |
|---|---|---|---|---|---|---|---|---|---|
| Ex.13 | Titanium oxide | 80 | C | 18 | PVCA D | 2 | A | A | B |
| Ex.14 | Titanium oxide | 80 | C | 18 | PVCA D | 2 | A | B | A |
| Ex.15 | Titanium oxide | 80 | C | 18 | PVCA D | 2 | A | B | A |
| Ex.16 | Titanium oxide | 80 | C | 18 | PVCA D | 2 | A | B | A |
| Ex.17 | Titanium oxide | 80 | C | 18 | PVCA D | 2 | A | B | A |
| Ex.18 | Titanium oxide | 80 | C | 18 | PVCA D | 2 | A | B | B |
| Ex.19 | Titanium oxide | 80 | C | 18 | PVCA D | 2 | A | A | B |
| Ex.20 | Titanium oxide | 80 | C | 18 | PVCA D | 2 | A | B | A |
| Ex.21 | Titanium oxide | 80 | C | 18 | PVCA D | 2 | A | A | B |

TABLE 2

| | Configuration of peeling layer | | | | | | Configuration of colored layer | | | | | |
|---|---|---|---|---|---|---|---|---|---|---|---|---|
| | Allyl resin | | Other resin material | | | | Colorant | | Allyl resin | | Other resin material | |
| | Type | Content (% by mass) | Type | Content (% by mass) | Type | Content (% by mass) | Type | Content (% by mass) | Type | Content (% by mass) | Type | Content (% by mass) |
| Ex.22 | C | 40 | Polyester A | 40 | PVCA D | 20 | Titanium oxide | 80 | C | 18 | PVCA D | 2 |
| Ex.23 | C | 40 | Polyester A | 40 | Polyvinyl acetal A | 20 | Titanium oxide | 80 | C | 18 | PVCA D | 2 |
| Ex.24 | C | 40 | Polyester A | 40 | Polyvinyl acetal B | 20 | Titanium oxide | 80 | C | 18 | PVCA D | 2 |
| Ex.25 | C | 40 | Polyester A | 40 | (Meth)acrylic resin A | 20 | Titanium oxide | 80 | C | 18 | PVCA D | 2 |
| Ex.26 | C | 40 | Polyester A | 40 | (Meth)acrylic resin B | 20 | Titanium oxide | 80 | C | 18 | PVCA D | 2 |
| Ex.27 | C | 50 | Polyester A | 50 | | | Titanium oxide | 75 | C | 23 | PVCA D | 2 |
| Ex.28 | C | 50 | Polyester A | 50 | | | Titanium oxide | 67 | C | 30 | PVCA D | 3 |
| Ex.29 | C | 50 | Polyester A | 50 | | | Titanium oxide | 80 | C | 16 | PVCA D | 4 |
| Ex.30 | C | 50 | Polyester A | 50 | | | Titanium oxide | 80 | C | 10 | PVCA D | 10 |
| Ex.31 | C | 50 | Polyester A | 50 | | | Titanium oxide | 80 | C | 18 | Polyester A | 2 |
| Ex.32 | C | 50 | Polyester A | 50 | | | Titanium oxide | 80 | C | 18 | Polyester E | 2 |
| Ex.33 | C | 50 | Polyester A | 50 | | | Titanium oxide | 80 | C | 18 | Polyester F | 2 |
| Ex.34 | C | 50 | Polyester A | 50 | | | Pearl pigment | 80 | C | 18 | PVCA D | 2 |
| Ex.35 | C | 50 | Polyester A | 50 | | | Pearl pigment | 80 | C | 18 | PVCA D | 2 |
| Ex.36 | C | 50 | Polyester A | 50 | | | Aluminum pigment | 80 | C | 18 | PVCA D | 2 |

| | Configuration of protective layer | | | | Configuration of adhesive layer | | | | | | Evaluation results | | |
|---|---|---|---|---|---|---|---|---|---|---|---|---|---|
| | Allyl resin | | Other resin material | | Colorant | | Allyl resin | | Other resin material | | | | |
| | Type | Content (% by mass) | Type | Content (% by mass) | Type | Content (% by mass) | Type | Content (% by mass) | Type | Content (% by mass) | Transferability | Thin-line printability | Durability |
| Ex.22 | C | 50 | Polyester A | 50 | Titanium oxide | 80 | C | 18 | PVCA D | 2 | A | A | A |
| Ex.23 | C | 50 | Polyester A | 50 | Titanium oxide | 80 | C | 18 | PVCA D | 2 | A | B | A |
| Ex.24 | C | 50 | Polyester A | 50 | Titanium oxide | 80 | C | 18 | PVCA D | 2 | A | A | A |
| Ex.25 | C | 50 | Polyester A | 50 | Titanium oxide | 80 | C | 18 | PVCA D | 2 | A | A | B |
| Ex.26 | C | 50 | Polyester A | 50 | Titanium oxide | 80 | C | 18 | PVCA D | 2 | A | B | B |
| Ex.27 | C | 50 | Polyester A | 50 | Titanium oxide | 75 | C | 23 | PVCA D | 2 | A | A | A |
| Ex.28 | C | 50 | Polyester A | 50 | Titanium oxide | 67 | C | 30 | PVCA D | 3 | A | A | A |
| Ex.29 | C | 50 | Polyester A | 50 | Titanium oxide | 80 | C | 16 | PVCA D | 4 | A | A | A |
| Ex.30 | C | 50 | Polyester A | 50 | Titanium oxide | 80 | C | 10 | PVCA D | 10 | A | B | A |
| Ex.31 | C | 50 | Polyester A | 50 | Titanium oxide | 80 | C | 18 | Polyester A | 2 | A | A | B |
| Ex.32 | C | 50 | Polyester A | 50 | Titanium oxide | 80 | C | 18 | Polyester E | 2 | A | A | B |
| Ex.33 | C | 50 | Polyester A | 50 | Titanium oxide | 80 | C | 18 | Polyester F | 2 | A | A | B |
| Ex.34 | C | 50 | Polyester A | 50 | Titanium oxide | 80 | C | 18 | PVCA D | 2 | A | A | B |
| Ex.35 | C | 50 | Polyester A | 50 | Carbon black | 50 | C | 45 | PVCA D | 5 | A | A | B |
| Ex.36 | C | 50 | Polyester A | 50 | Carbon black | 50 | C | 45 | PVCA D | 5 | A | A | B |

TABLE 3

| | Configuration of peeling layer | | | | Configuration of colored layer | | | | | |
|---|---|---|---|---|---|---|---|---|---|---|
| | Allyl resin | | Other resin material | | Colorant | | Allyl resin | | Other resin material | |
| | Type | Content (% by mass) | Type | Content (% by mass) | Type | Content (% by mass) | Type | Content (% by mass) | Type | Content (% by mass) |
| Com. Ex.1 | PVCA B | 100 | | | Titanium oxide | 80 | PVCA B | 20 | | |
| Com. Ex.2 | Polyester A | 100 | | | Titanium oxide | 80 | Polyester A | 20 | | |
| Com. Ex.3 | (Meth)acrylic resin A | 100 | | | Titanium oxide | 80 | (Meth)acrylic resin A | 20 | | |
| Com. Ex.4 | (Meth)acrylic resin A | 50 | Polyester A | 50 | Titanium oxide | 80 | (Meth)acrylic resin A | 18 | PVCA D | 2 |
| Com. Ex.5 | PVCA D | 50 | Polyester A | 50 | Titanium oxide | 80 | PVCA D | 20 | | |

| | Configuration of protective layer | | | | Configuration of adhesive layer | | | | | |
|---|---|---|---|---|---|---|---|---|---|---|
| | Allyl resin | | Other resin material | | Colorant | | Allyl resin | | Other resin material | |
| | Type | Content (% by mass) | Type | Content (% by mass) | Type | Content (% by mass) | Type | Content (% by mass) | Type | Content (% by mass) |
| Com. Ex.1 | PVCA B | 100 | | | Titanium oxide | 80 | PVCA B | 20 | | |
| Com. Ex.2 | Polyester A | 100 | | | Titanium oxide | 80 | Polyester A | 20 | | |
| Com. Ex.3 | (Meth)acrylic resin A | 100 | | | Titanium oxide | 80 | (Meth)acrylic resin A | 20 | | |
| Com. Ex.4 | (Meth)acrylic resin A | 50 | Polyester A | 50 | Titanium oxide | 80 | (Meth)acrylic resin A | 18 | PVCA D | 2 |
| Com. Ex.5 | PVCA D | 50 | Polyester A | 50 | Titanium oxide | 80 | PVCA D | 20 | | |

| | Evaluation results | | |
|---|---|---|---|
| | Transferability | Thin-line printability | Durability |
| Com. Ex.1 | NG | NG | — |
| Com. Ex.2 | NG | NG | — |
| Com. Ex.3 | C | B | NG |
| Com. Ex.4 | C | B | C |
| Com. Ex.5 | C | NG | A |

<Plasticizer Resistance Evaluation>

The printed materials obtained using the thermal transfer sheets of Examples 1 to 10 in the above transferability test were placed on plasticizer-containing soft vinyl chloride sheets (Altron (registered trademark) manufactured by Mitsubishi Chemical Corporation) and were allowed to stand under a load of 40 g/cm$^2$ in an environment at 50° C. for 60 hours.

After standing, the soft vinyl chloride sheets were removed, and the images formed on the printed materials were visually observed and were evaluated based on the following evaluation scale. The evaluation results are shown in Table 4.

(Evaluation Scale)

A: The image showed no change after the test and exhibited high plasticizer resistance.

B: The image showed bleeding.

TABLE 4

| | Plasticizer resistance evaluation |
|---|---|
| Example 1 | A |
| Example 2 | A |
| Example 3 | A |
| Example 4 | B |
| Example 5 | B |
| Example 6 | A |

TABLE 4-continued

| | Plasticizer resistance evaluation |
|---|---|
| Example 7 | A |
| Example 8 | A |
| Example 9 | B |
| Example 10 | B |

As will be understood by those skilled in the art, the present invention is not limited to the description of the foregoing examples, and the foregoing examples and specification are intended merely to explain the principles of the present disclosure. Various modifications and improvements can be made without departing from the spirit and scope of the present disclosure, and all such modifications and improvements are included within the scope of the present disclosure claimed for protection. Furthermore, the scope of the present disclosure claimed for protection includes the description of the claims and equivalents thereof.

REFERENCE SIGNS LIST

10: thermal transfer sheet, 11: substrate, 12: peeling layer, 13: transfer layer, 14: colored layer, 15: protective layer 16: adhesive layer, 17: back layer

The invention claimed is:

1. A thermal transfer sheet comprising a substrate and a transfer layer disposed on the substrate, the transfer layer including at least a peeling layer, and a colored layer disposed on the peeling layer, the peeling layer consisting essentially of an allyl resin and a polyester; and the colored layer contains a colorant, an allyl resin and vinyl resin.

2. The thermal transfer sheet according to claim 1, wherein the transfer layer further includes a protective layer disposed on the colored layer or between the peeling layer and the colored layer, and the protective layer contains an allyl resin.

3. The thermal transfer sheet according to claim 1, wherein the transfer layer includes an adhesive layer containing an allyl resin at an outermost surface thereof.

4. The thermal transfer sheet according to claim 3, wherein the adhesive layer contains a colorant.

5. The thermal transfer sheet according to claim 1, wherein the allyl resin contains diallyl phthalate as a polymerization component.

6. The thermal transfer sheet according to claim 1, wherein the allyl resin is at least one resin selected from the group consisting of the following general formulas (1) to (4):

(1)

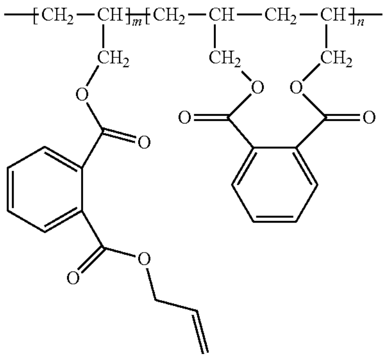

(2)

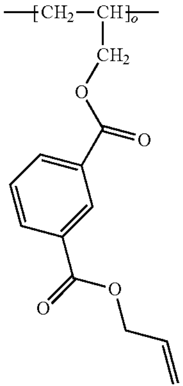

-continued (3)

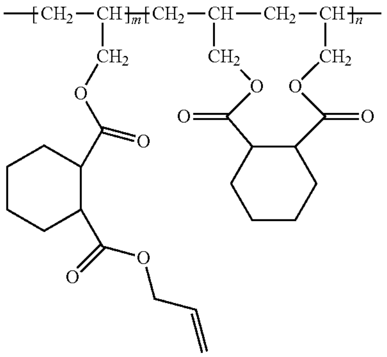

(4)

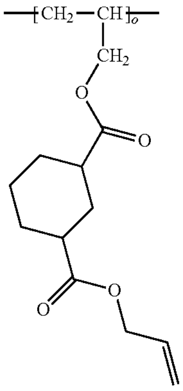

wherein, in formulas (1) to (4), m, n, and o represent an integer of 1 or more.

7. The thermal transfer sheet according to claim 1, wherein the allyl resin has a weight average molecular weight (Mw) of 5,000 or more and 100,000 or less.

8. The thermal transfer sheet according to claim 1, wherein a ratio of a content of the polyester to a content of the allyl resin in the peeling layer (content of polyester/content of allyl resin) is 10/90 or more and 85/15 or less by mass.

9. The thermal transfer sheet according to claim 3, wherein the adhesive layer further contains a vinyl resin.

10. The thermal transfer sheet according to claim 9, wherein a ratio of a content of the vinyl resin to a content of the allyl resin in the adhesive layer (content of vinyl resin/content of allyl resin) is 10/90 or more and 60/40 or less by mass.

* * * * *